April 14, 1925.

G. L. E. KLINGBEIL 1,533,992

AUTOMOBILE SPRING SPREADER

Filed Feb. 26, 1924

Inventor
G. L. E. Klingbeil,

By Samuel Herrick,
Attorney

Patented Apr. 14, 1925.

1,533,992

UNITED STATES PATENT OFFICE.

GOTTLIEB L. E. KLINGBEIL, OF OMAHA, NEBRASKA, ASSIGNOR TO CENTRAL TRADING COMPANY, OF DOVER, DELAWARE.

AUTOMOBILE SPRING SPREADER.

Application filed February 26, 1924. Serial No. 695,209.

*To all whom it may concern:*

Be it known that GOTTLIEB L. E. KLINGBEIL, a citizen of the United States, residing at Omaha, in the county of Douglas and State of Nebraska, has invented certain new and useful Improvements in Automobile Spring Spreaders, of which the following is a specification.

This invention relates to an automobile spring spreader and it has for its object to provide a device of this character in the nature of a hand tool, constructed in such manner as to separate the leaves of automobile springs, so that lubricant may be inserted therebetween when desired.

Further objects and advantages of the invention will be set forth in the detailed description which follows.

In the accompanying drawing.

Like numerals designate corresponding parts in all of the figures of the drawing.

Figure 1:
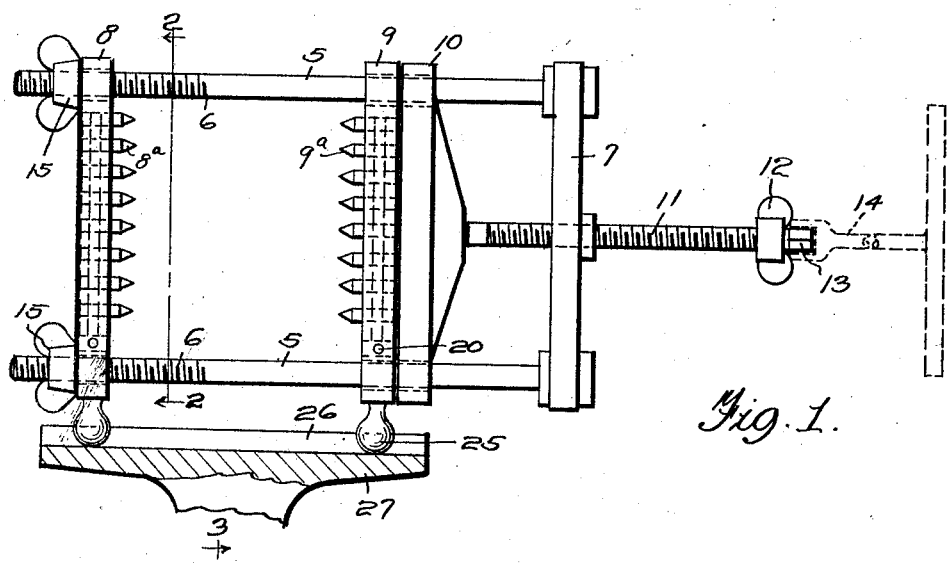
Fig. 1 is a side elevation of a spring spreader constructed in accordance with the invention.
Figures 2, 3:
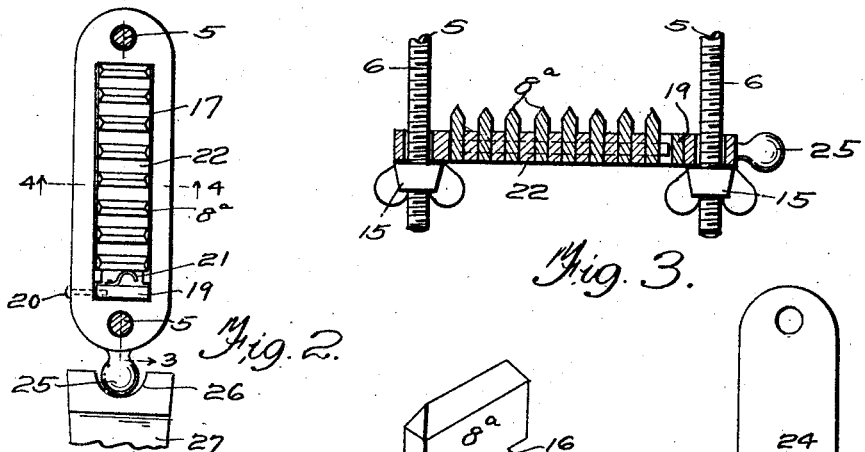
Fig. 2 is a sectional view on line 2—2 of Fig. 1.
Fig. 3 is a fragmentary sectional view on line 3—3 of Fig. 2.

The spring spreader of the present invention comprises a pair of rods 5 which are threaded at 6. These rods are carried by a head plate 7. A pair of wedge plates 8 and 9 and a follower plate 10 are mounted to slide on the rods 5. The follower plate 10 and wedge plate 9 may be forced toward the wedge plate 8 under the action of a screw 11 which is threaded into the plate 7. The screw 11 carries a thumb piece 12 by which the screw may be turned to adjust the tool in proper relation upon the spring, after which a more powerful movement may be imparted to the screw 11 by a socket wrench 14 which is adapted to engage an angular portion 13 upon the outer end of the screw.

The socket wrench 14 may be of any desired length and, in fact, may be long enough so that its operating handle will lie outside of the wheels of the automobile so that the user may get at it without difficulty. Thumb nuts 15 are threaded upon the rods 5 and in placing the tool in position upon the springs these thumb nuts are removed and the rods 5 are passed above and below the spring. Then the wedge plate 8 is placed upon the rods 5 and the thumb nuts 15 are replaced. When the follower plate 10 and wedge plate 9 are forced toward the wedge plate 8 under the action of the screw 11 the wedges $8^a$ and $9^a$ will be forced between the several leaves of the spring and thus separate these leaves a sufficient distance to permit the insertion of lubricant therebetween.

Figure 5:
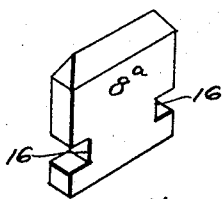
Fig. 5 is a perspective view of one of the wedges.
Figure 4:
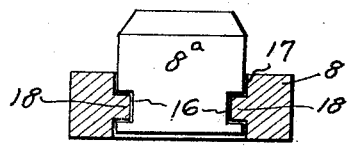
Fig. 4 is a transverse sectional view through one of the plates on line 4—4 of Fig. 2.

As is clearly illustrated in Figs. 4 and 5 these wedges have notches 16 formed in their edges, which notches receive ribs 18 which extend along the opposite sides of elongated openings 17 formed in the plates 8 and 9. The ribs 18 terminate short of one end of the openings 17 to permit of the insertion of the wedges. After the several wedges have been placed in position in the openings of the wedge plates filling blocks 19 are secured in place by screws 20, whereby the wedges are prevented from falling out.

Each bank of wedges may be floatingly mounted as a whole by the interposition of a flat spring 21, which bears between filling block 19 and the adjacent wedge.

If desired filling block 22 may be employed to space the several wedges apart any desired distance according to the thickness of the leaves of spring being operated upon.

By virtue of the fact that the several wedges are floatingly mounted, said wedges are caused to seek that position where they will be properly aligned with the lines of division between the several leaves of the spring.

Figure 6:
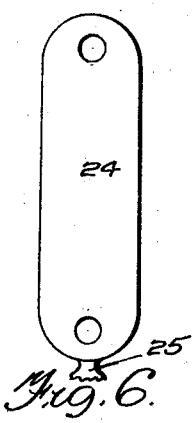
Fig. 6 is a perspective view of a substitute plate hereinafter described.

In some makes of automobiles the spring lies so close to the body of the car that it would not be possible to get the wedge plate 8 in place. In such cases as that I utilize a substitute plate shown in Fig. 6, which is merely a thin plain plate which is slipped on in place of the wedge plate 8 and serves as a backing to resist outward movement of the rest of the structure. Under these circumstances the forcing of the leaves apart is under the influence of wedges 9ª of wedge plate 9.

It is sometimes the case that the part of the spring to be engaged lies at an angle other than the horizontal. While the tool may be manipulated wholly as a hand tool, yet, as an auxiliary feature, which may or may not be employed, I provide upon the plates 8 and 9 and the substitute plain plate 24 of Fig. 6 spherical knobs 25 adapted to rest in an arcuate groove formed in plate 27 which may be the top plate of an ordinary automobile jack. Thus this plate forms a support upon which the tool may be rested during the time it is being adjusted to the proper angle.

It is to be understood that the invention is not limited to the precise construction set forth but that it includes within its purview whatever changes fairly come within either the terms or the spirit of the appended claims.

Having described my invention what I claim is,

1. A device of the character described comprising a pair of rods, a plate supported thereon, a second plate slidable thereon, a transverse element connecting said rods, a manually operable screw working in said element, a follower movable along said rods under the influence of said screw and a plurality of wedges floatingly mounted in each of said plates.

2. A structure as recited in claim 1 wherein said wedges are mounted in elongated openings formed in said plates.

3. A device of the character described comprising a supporting structure adapted to embrace an automobile spring, a wedge plate movable in a straight line thereon and having an elongated opening formed therethrough, a rib extending longitudinally along each side of the opening, and wedges having notches in their edges for engagement with said ribs.

4. A device of the character described comprising a supporting structure adapted to embrace an automobile spring, a wedge plate movable thereon and having an elongated opening formed therethrough, a rib extending longitudinally along each side of the opening, wedges having notches in their edges for engagement with said ribs, and a filling block insertable within said opening to limit the longitudinal movement of the wedges therein and to prevent disengagement of the wedges from said ribs.

5. A device of the character described comprising a supporting structure adapted to embrace an automobile spring, a wedge plate movable in a straight line thereon and having an elongated opening formed therethrough, a rib extending longitudinally along each side of the opening, wedges having notches in their edges for engagement with said ribs, and spring means bearing upon said wedges and floatingly mounting them in said opening.

6. The combination with a hand tool of the character described carrying a plurality of spring engaging wedges, of a jack having a recessed upper face and rounded elements upon the hand tool adapted to have a seating in the recessed upper face of the jack to tiltingly support the hand tool while it is being adjusted to the proper angle.

7. A device of the character described comprising a pair of spaced wedge carrying blocks, a pair of supporting elements extending from one of said blocks and upon which the other of said blocks is mounted to slide in a straight line, a screw for forcing the last named block along said support and a plurality of wedges floatingly mounted in each of said blocks.

In testimony whereof he affixes his signature in the presence of two witnesses.

GOTTLIEB L. E. KLINGBEIL.

Witnesses:
 MAUDE C. SHEPARD,
 GEORGE E. CLARK.